United States Patent [19]
Ohmi et al.

[11] Patent Number: 6,018,136
[45] Date of Patent: Jan. 25, 2000

[54] SYSTEM FOR SUPERVISING PIPING WORK

[75] Inventors: Tadahiro Ohmi, Sendai; Ryosuke Dohi, Osaka; Eiji Ideta, Osaka; Hiroyuki Fukuda, Osaka; Hiroshi Morokoshi, Osaka; Nobukazu Ikeda, Osaka, all of Japan

[73] Assignees: Tadahiro OHMI, Sendia; Fujikin Incorporated, Osaka, both of Japan

[21] Appl. No.: 09/315,338

[22] Filed: May 20, 1999

Related U.S. Application Data

[63] Continuation of application No. 08/865,767, May 30, 1997, Pat. No. 5,981,905.

[30] Foreign Application Priority Data

Jun. 3, 1996 [JP] Japan ................................. 8-140029

[51] Int. Cl.$^7$ .................................................. B23K 9/095
[52] U.S. Cl. .................................. 219/130.01; 219/60 A; 219/125.11
[58] Field of Search ........................... 219/125.11, 130.01, 219/60 A, 61, 75

[56] References Cited

U.S. PATENT DOCUMENTS

| | | | |
|---|---|---|---|
| 3,621,177 | 11/1971 | McPherson et al. ...................... | 219/61 |
| 5,059,765 | 10/1991 | Laing ................................... | 219/125.11 |
| 5,500,512 | 3/1996 | Goldblatt ................................ | 228/102 |
| 5,571,431 | 11/1996 | Lantieri et al. ...................... | 219/130.01 |
| 5,620,625 | 4/1997 | Sauron et al. ........................... | 219/497 |
| 5,708,253 | 1/1998 | Bloch et al. .......................... | 219/130.01 |

FOREIGN PATENT DOCUMENTS

| | | | |
|---|---|---|---|
| 571116 | 3/1988 | Australia . | |
| 0077249 | 4/1983 | European Pat. Off. . | |
| 2 730 059 | 8/1996 | France . | |
| 4031895 | 4/1991 | Germany . | |
| 57-202980 | 12/1982 | Japan ................................. | 219/137 R |

*Primary Examiner*—Clifford C. Shaw
*Attorney, Agent, or Firm*—Armstrong, Westerman, Hattori, McLeland, & Naughton

[57] ABSTRACT

A system of the invention for supervising piping work comprises a machine for performing piping work such as welding of pipes or tightening of pipe joints under predetermined conditions, check means for checking whether the piping work has been executed properly based on predetermined values of piping work conditions and actual piping work data, a host computer for accumulating the predetermined values of piping work conditions, the actual piping work data and the result of checking, and communication means for transmitting the predetermined values of piping work conditions, the actual piping work data and the result of checking.

3 Claims, 9 Drawing Sheets

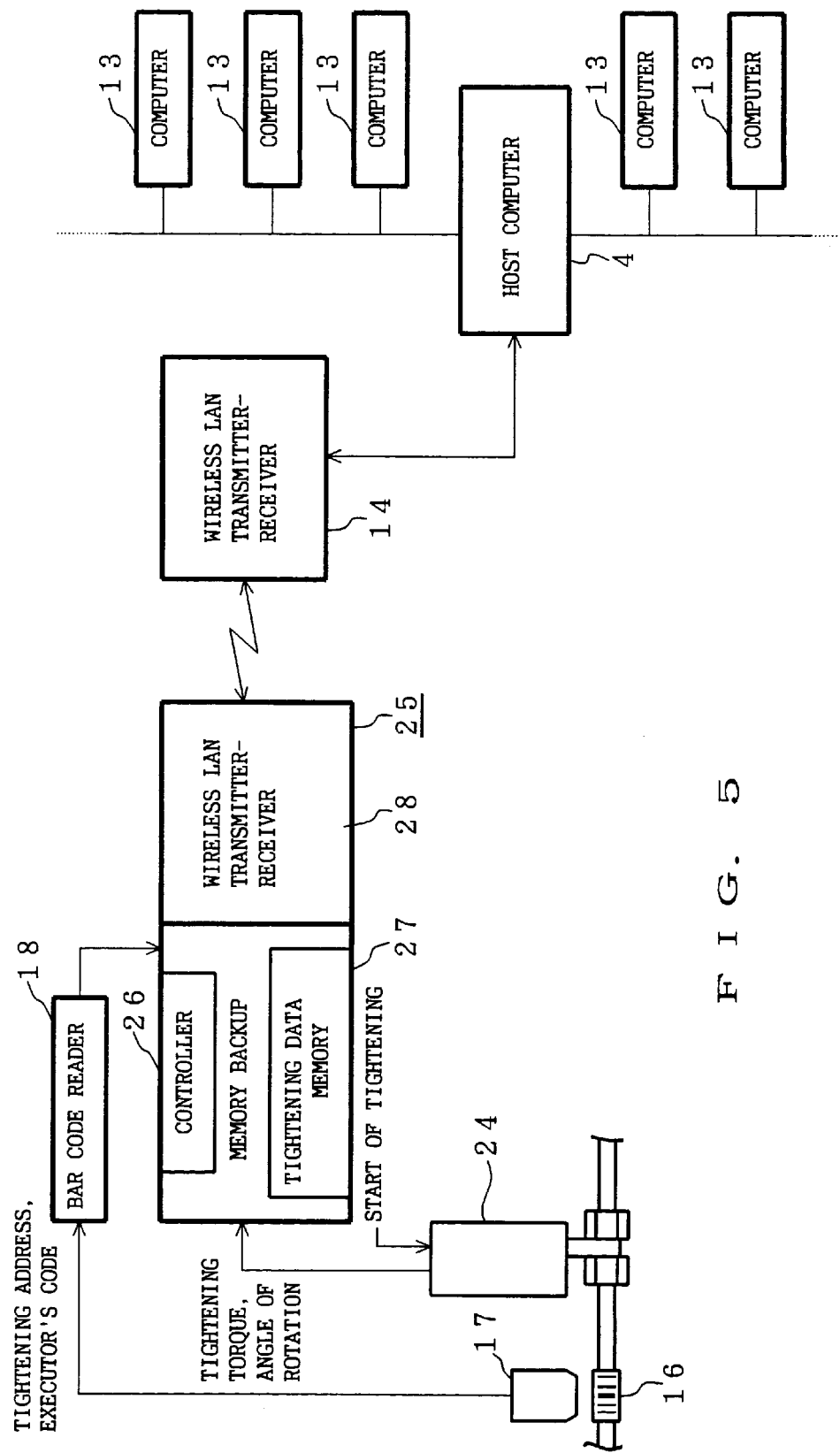
F I G. 5

SYSTEM FOR SUPERVISING PIPING WORK

This application is a Continuation of prior application Ser. No. 08/865,767 filed May 30, 1997, now U.S. Pat. No. 5,981,905.

BACKGROUND OF THE INVENTION

The present invention relates to supervising systems for use in performing piping work in semiconductor manufacturing plants, etc.

Machines for performing piping work, such as welding of pipes and tightening of pipe joints, under predetermined conditions, i.e., automatic welders, automatic tightening machines and like machines are conventionally used, for example, in semiconductor manufacturing plants. The piping work is performed at the actual site and completed at the site, and nothing whatever is known about a method of superposing the piping work including accumulation of data.

The gastightness of the piping system is of extreme importance in semiconductor manufacturing plants wherein hazardous gases are used; a fault in the piping work could lead to an accident. However, after the piping work has been completed, no record is conventionally left as to what particular conditions are employed for the piping work of particular portions of the piping system, consequently entailing the problem that it impossible to realize whether the piping work has been executed properly.

SUMMARY OF THE INVENTION

An object of the present invention is to provide a piping work supervising system which is capable of precluding accidents in piping due to faulty piping work.

The present invention provides a system for supervising piping work comprising a machine for performing piping work such as welding of pipes or tightening of pipe joints under predetermined conditions, check means for checking whether the piping work has been executed properly based on predetermined values of piping work conditions and actual piping work data, a computer for accumulating the predetermined values of piping work conditions, the actual piping work data and the result of checking, and communication means for transmitting the predetermined values of piping work conditions, the actual piping work data and the result of checking.

The supervising system of the invention checks whether the piping work has been executed properly, and accumulates the predetermined values of piping work conditions, the actual piping work data and the result of checking. This precludes accidents in the piping due to faults in the piping work, further making it possible to pick up the main portions to be checked from among the portions of the piping worked on with reference to the actual piping work data when the piping is to be inspected, and to inspect the main portions only which are smaller in number than all the worked-on portions.

Preferably, the communication means is on a spread-spectrum communication system. This system is such that the signal, subjected to usual phase modulation, is then multiplied by a special spreading code at the transmitter side, and multiplied by the same spreading signal at the receiver side to retrieve the original signal. With this system, the signal is spread over a wider frequency range and therefore lower in electric power density, i.e., in electric power per unit frequency. Accordingly, the system has the advantage of being less affected by the noise of the work site.

The piping work chiefly includes welding of pipes and tightening of pipe joints.

Preferably, a piping work supervising system for use in welding pipes comprises an automatic welder for welding the pipe, a welding data output device for outputting predetermined values of welding conditions for the welder and actual welding data, a welding data processor for checking whether output values from the output device are proper and temporarily accumulating the welding data and the result of checking, and a host computer connected to the processor by a local area network (LAN) for accumulating the welding data and the result of checking. This system ensures a proper welding operation, consequently precluding accidents in the piping due to faulty welding. Furthermore, reference to the welding data and the result of checking accumulated in the host computer leads to facilitated supervision for the maintenance of the welded portions.

Preferably, a piping work supervising system for use in tightening up pipe joints comprises a machine for automatically tightening up the pipe joint, a tightening data processor provided in the tightening machine for checking whether tightening data is proper and accumulating predetermined values of tightening conditions, actual tightening data and the result of checking, and a host computer connected to the processor by a local area network (LAN) for accumulating the tightening data and the result of checking. This system ensures a proper tightening operation, consequently precluding accidents in the piping due to faulty tightening. Furthermore, reference to the tightening data and the result of checking accumulated in the host computer leads to facilitated supervision for the maintenance of the pipe joints.

It is desired that the host computer be connected to a plurality of terminal computers by a network. Any of the terminal computers then allows the work supervisor access to the welding or tightening record, while the supervisor can issue a command from the terminal computer to the data processor via the host computer when the work is to be interrupted or the work conditions are to be altered. Thus, the networked system enables the supervisor to recognize reliable execution of the welding or tightening operation at a location remote from the work site.

BRIEF DESCRIPTION OF THE DRAWINGS

FIG. 5 is a block diagram showing another embodiment of piping work supervising system of the invention, i.e., a pipe joint tightening system;

DESCRIPTION OF THE PREFERRED EMBODIMENTS

Embodiments of the present invention will be described below with reference to the drawings.

Figure 1:
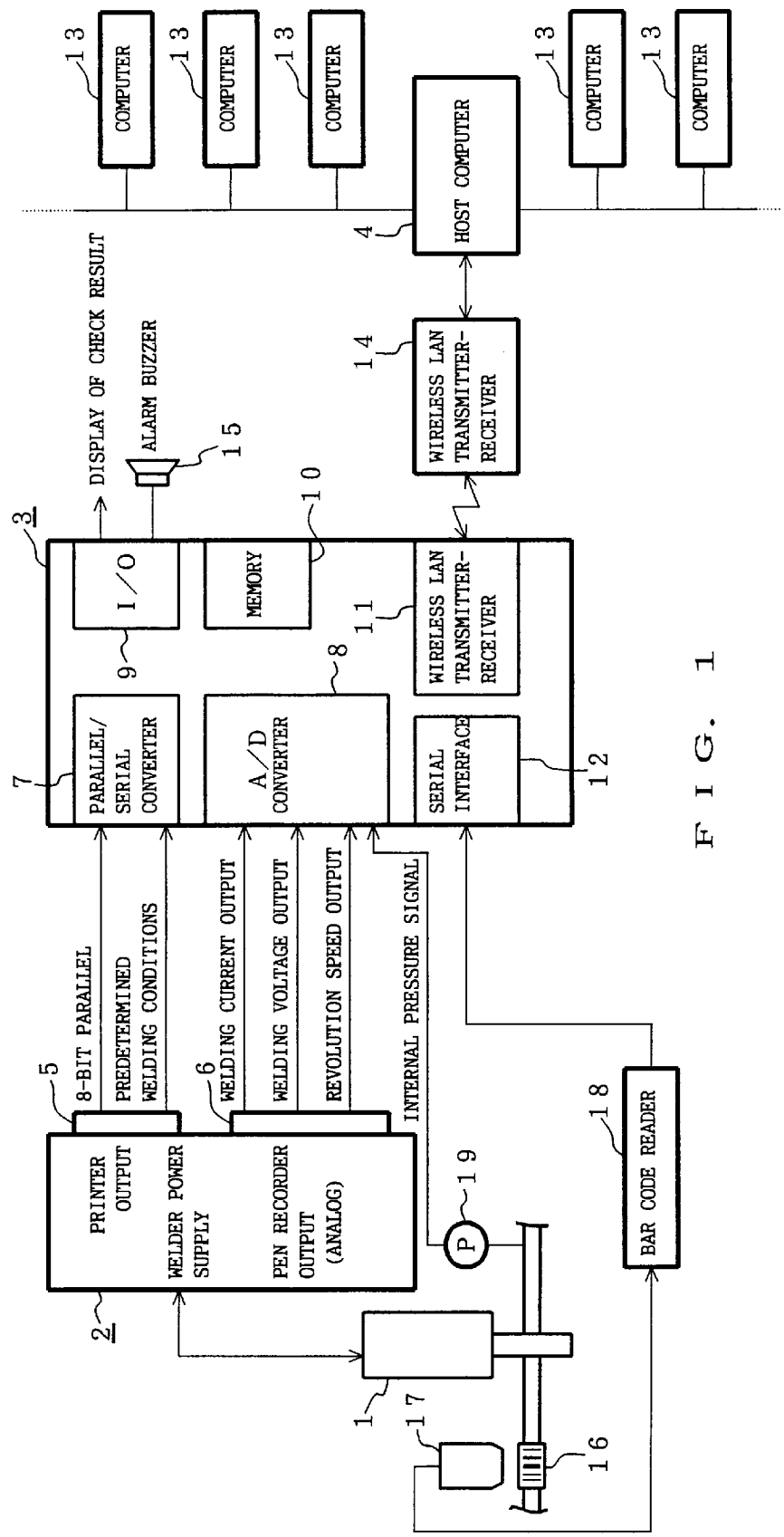
FIG. 1 is a block diagram showing a first embodiment of piping work supervising system of the invention, i.e., a welding system.

FIG. 1 is a block diagram showing a piping work supervising system of the invention for use as a pipe welding system. With reference to the drawing, the piping work supervising system for a pipe welding operation comprises an automatic welder 1 for piping, a welding data output device 2 for delivering predetermined values of welding conditions for the welder 1 and actual welding data, a welding data processor 3 for checking whether or not output values from the output unit 2 are proper and accumulating the welding data and the result of checking, and a host computer 4.

Figure 2:
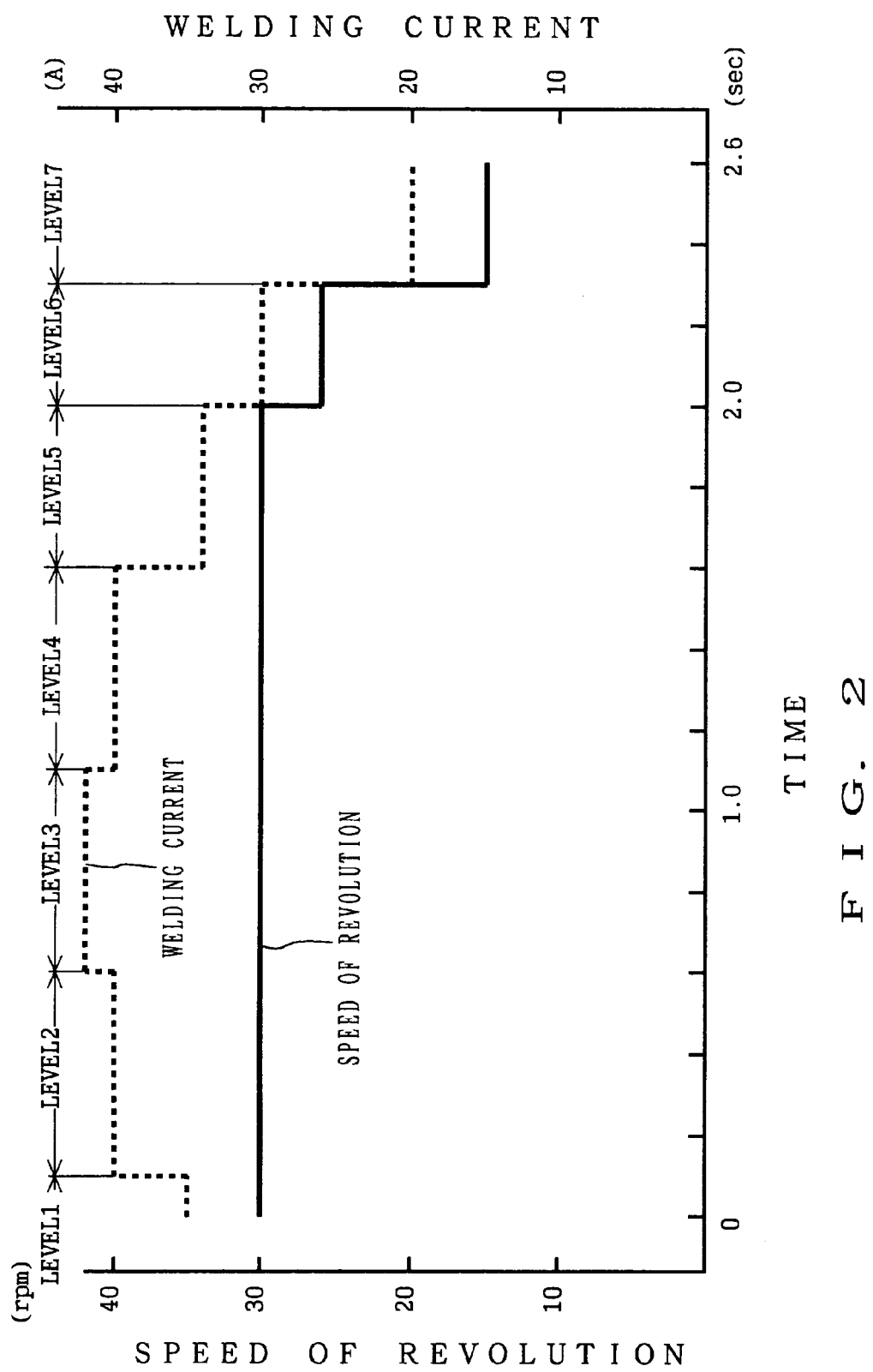
FIG. 2 is a time chart showing the welding conditions for a welder for use in the welding system.

The welder 1 is a known one (for example, MODEL 207 of Arc Machine Co.). The welder is set on a pipe at the joint portion thereof to be welded, and the switch is then turned on, whereupon the welder revolves around the pipe one turn to weld the pipe under the predetermined conditions. The welding conditions to be checked for judging whether a proper weld is formed include the welding time, welding current, welding voltage, speed of revolution and pressure of back-shielding gas during welding (pressure during welding). FIG. 2 shows an example of time chart of welding conditions. The welding conditions include a plurality of levels of short duration which are changed over from one to another. The chart shows that the welding current is 35 A for 0.1 second at level 1, 40 A for 0.5 second at level 2, 42 A for 0.5 second at level 3, 40 A for 0.5 second at level 4, 33 A for 0.4 second at level 5, 30 A for 0.3 second at level 6, and 20 A for 0.3 second at level 7, further showing that the speed of revolution is 30 r.p.m. for 2.0 seconds at level 1 through level 5, 26 r.p.m. at level 6 and 15 r.p.m. at level 7.

The welding data output device 2 has a welder power supply incorporated therein, a printer output unit 5 for outputting the predetermined condition values as to the welding time, welding current and speed of revolution for each level as 8-bit parallel data, and a pen recorder output unit 6 for outputting the actual analog values of welding current, welding voltage and speed of revolution during welding.

The welding data processor 3 comprises a parallel/serial converter 7 for converting the predetermined condition values delivered from the output device 2 in the form of 8-bit parallel data to serial data, an A/D converter 8 for converting the actual analog values delivered from the output device 2 to digital data, a check result output unit (I/O unit) 9 for checking whether the welding data is proper and delivering the result, a memory 10 for storing the predetermined values of the welding conditions, the actual welding data and the check result, a wireless LAN transmitter-receiver 11 for transferring data to and from the host computer 4 and a serial interface 12 for delivering welding data to the transmitter-receiver 11.

The host computer 4 is connected to a plurality of terminal computers 13 by a network. The host computer 4 is also provided with a wireless LAN transmitter-receiver 14.

The check result output unit 9 of the welding data processor 3 indicates the check result and actuates an alarm buzzer 15 when the weld is unacceptable.

The memory 10 of the processor 3 temporarily stores data including the welding address, work executor's code, predetermined condition values, welding current, welding voltage, revolution speed, internal pressure during welding, welding date and time and check result. Such data is transmitted to the host computer 4 via the transmitter-receivers 11, 14 and stored in the computer 4.

The wireless LAN transmitter-receivers 11, 14 exchange spread-spectrum wireless communications and can transfer data within the range of up to about 200 m even with use of a feeble current. Other system is of course usable for the transmitter-receivers 11, 14.

A bar code 16 representing a welding address and executor's code is provided for the portion to be welded. These welding address and executor's code are read by a bar code scanner 17 and sent by a bar code reader 18 to the serial interface 12 of the welding data processor 3. The internal pressure of the welder 1 during welding is measured by a pressure sensor 19 and sent to the A/D converter 8 of the processor 3. Instead of providing the bar code 16, the welding address and the executor's code may be input to the processor 3 by the host computer 4.

Since the host computer 4 is connected to the terminal computers 13 by a network, any of the terminal computers 13 allows the work supervisor access to the welding record, while the supervisor can issue a command from the terminal computer 13 to the welding data processor 3 via the host computer 4 when the work is to be discontinued in an emergency or the welding conditions are to be altered. Thus, the networked system enables the supervisor to recognize reliable execution of the welding operation at a location remote from the welding site.

Figure 3:
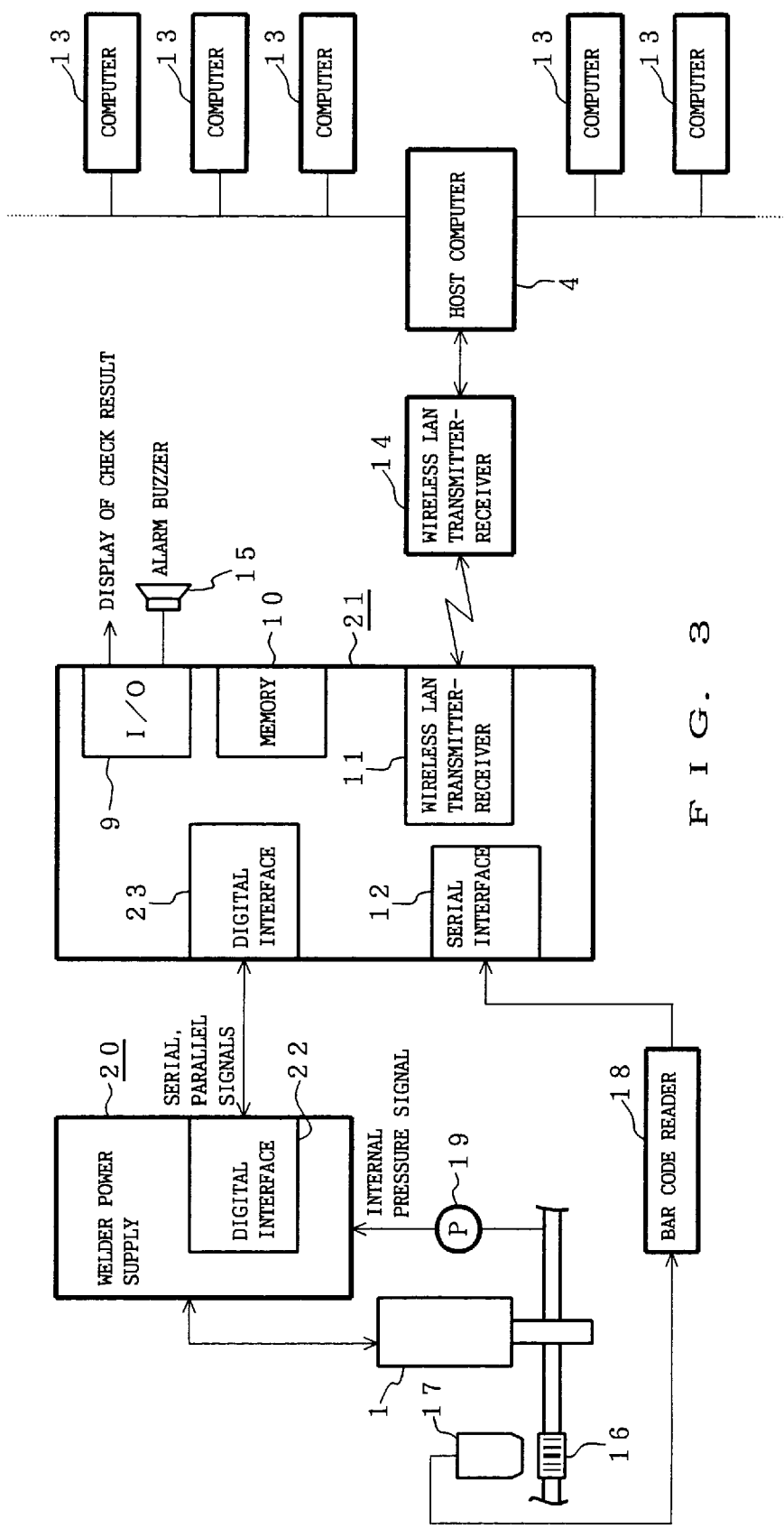
FIG. 3 is a block diagram showing a modification of the welding system.

The parallel/serial convertor 7 and the A/D converter 8 of the welding data processor 3, which are intended to conform to the data output mode of the output device 2, can be modified or eliminated in conformity with the data output mode of the device 2. FIG. 3 shows such a modification. Throughout FIGS. 1 and 3 like parts are designated by like reference numerals and will not be described repeatedly.

With reference to FIG. 3, a welding data output device 20 has incorporated therein a power supply for the welder 1. Predetermined condition values as to the welding time, welding current and speed of revolution at each level, and actual values of welding current, welding voltage and speed of revolution during welding are all delivered in the form of digital values through a digital interface 22. In corresponding relation with the device 20, a welding data processor 21 has a digital interface 23 in place of the parallel/serial converter 7 and the A/D converter 8. The digital values are transferred from the output device 20 to the processor 21 by serial and/or parallel signals.

Figure 4:
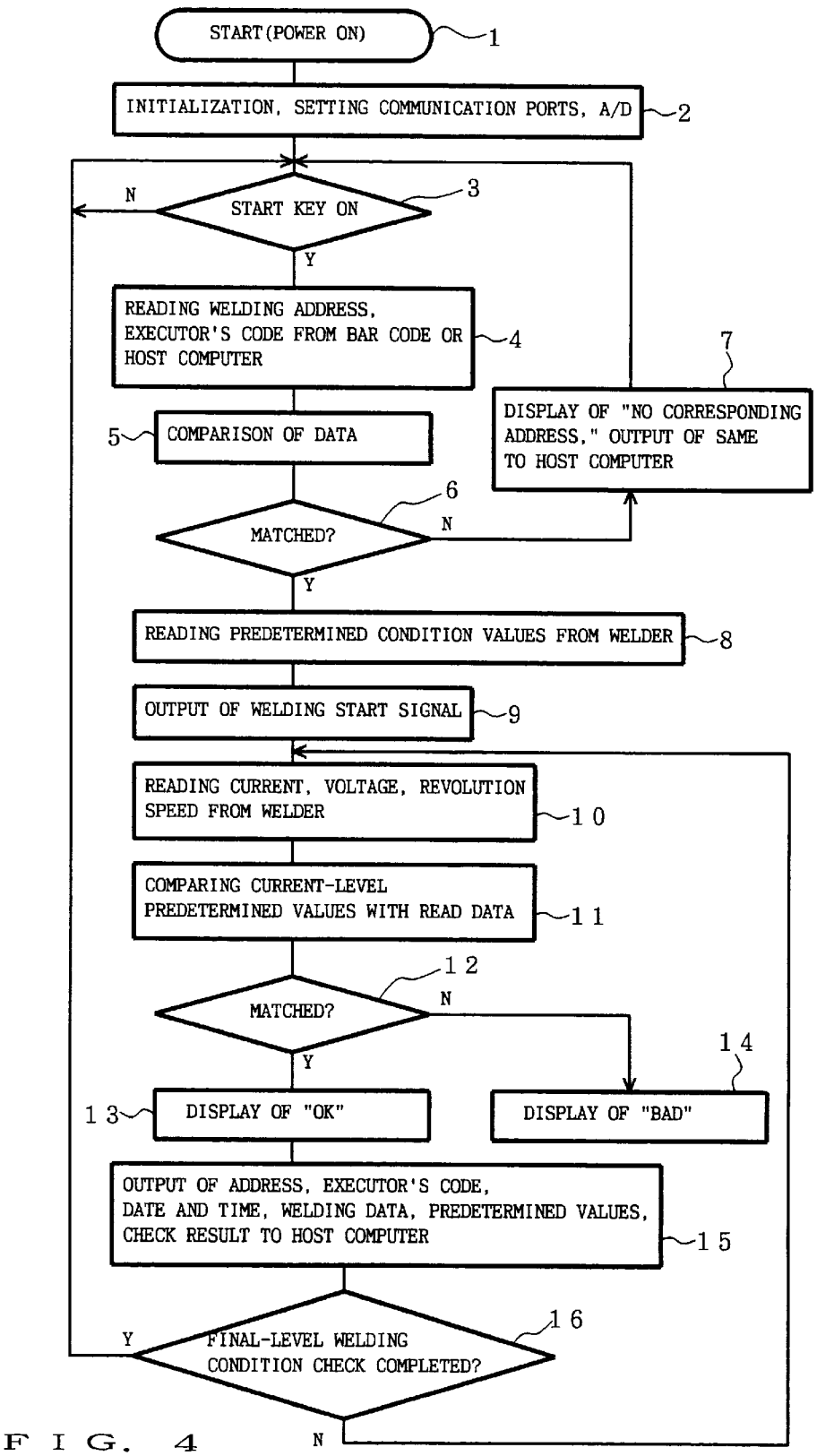
FIG. 4 is a flow chart showing the main routine of checking portion of the welding system.

The main routine of the welding data processor 3 will be described next with reference to FIG. 4.

The power supply is turned on (step 1), whereupon the system is initialized (step 2). The start key is then pressed (step 3), whereupon the welding address and executor's code are read from the bar code (step 4). Alternatively, the welding address and the executor's code may be input from the host computer in step 4. The address and the code are compared with the welding address and executer's code stored in the memory (step 5) and checked for a match (step 6). When they do not match the stored data, lack of the corresponding address is displayed on the check result output unit, and the result is output to the host computer, whereupon the sequence returns to step 3 (step 7). If a match is obtained in step 6, the predetermined condition values for each level delivered from the welder are read (step 8), and a welding start signal is output (step 9), whereby a welding operation is started. The actual values of welding current, welding voltage and revolution speed at each level delivered from the welder are read (step 10). These actual values of current, voltage and speed are compared with the respective predetermined condition values read in step 10 (step 11), and checked for matching (step 12). If the read values are found to match the predetermined values, the check result output unit displays "OK" (step 13). If otherwise, the check result output unit shows "BAD" (step 14). Regardless of the check result, the welding address, executor's code, welding date and time, welding data, predetermined welding condition values and check result are fed to the host computer (step 15).

Step 10 through step 15 are repeated for every level of the welding conditions shown in FIG. 2, and an inquiry is made as to whether the welding condition checking for the final level has been completed (step 16). When the inquiry is answered in the affirmative, the sequence returns to step 3. In this way, the welding conditions are checked at every level to ensure a reliable welding operation.

Step 12 also inquires whether the electrode of the welder is to be replaced. If the welder is set at a welding frequency of 50 times until the replacement of the electrode, the number of times the welding operation is conducted following the replacement is automatically counted, and an alarm for the replacement of the electrode is given on completion of the 50th welding operation. This eliminates unacceptable welds due to a fault in the electrode to improve the reliability of welding operation.

FIG. 5 is a block diagram showing a piping work supervising system of the invention for use as a pipe joint tightening system. With reference to the drawing, the piping work supervising system for pipe joint tightening work comprises an automatic tightening machine 24 for piping, a tightening data processor 25 provided for the machine 24, and a host computer 4.

The tightening data processor 25, which is provided in a microcomputer 29 of the tightening machine 24 as will be described later, comprises a controller 26 for checking whether tightening data is proper and outputting the check result, a memory 27 for storing predetermined values of tightening conditions, actual tightening data and check result, and a wireless LAN transmitter-receiver 28.

The host computer 4 is connected to a plurality of terminal computers 13 by a network. The host computer 4 is also provided with a wireless LAN transmitter-receiver 14.

The memory 27 of the tightening data processor 25 temporarily stores the tightening address, executor's code, tightening torque, angle of tightening rotation, tightening date and time, and check result. These items of data are transmitted to the host computer 4 via the wireless LAN transmitter-receivers 28, 14 and stored in the host computer.

The wireless LAN transmitter-receivers 11, 14 exchange spread-spectrum wireless communications and can transfer data within the range of up to about 200 m even with use of a feeble current. Other system is of course usable for the transmitter-receivers 11, 14.

A bar code 16 representing a tightening address and executor's code is provided for the portion to be tightened up. The tightening address and executor's code are read by a bar code scanner 17 and sent by a bar code reader 18 to the tightening data processor 25. Instead of providing the bar code 16, the tightening address and the executor's code may be input to the processor by the host computer 4.

Since the host computer 4 is connected to the terminal computers 13 by a network, any of the terminal computers 13 allows the work supervisor access to the tightening record, while the supervisor can issue a command from the terminal computer 13 to the tightening data processor 25 via the host computer 4 when the work is to be interrupted temporarily or the tightening conditions are to be altered. Thus, the networked system enables the supervisor to recognize reliable execution of the tightening operation at a location remote from the tightening site.

Figure 6:
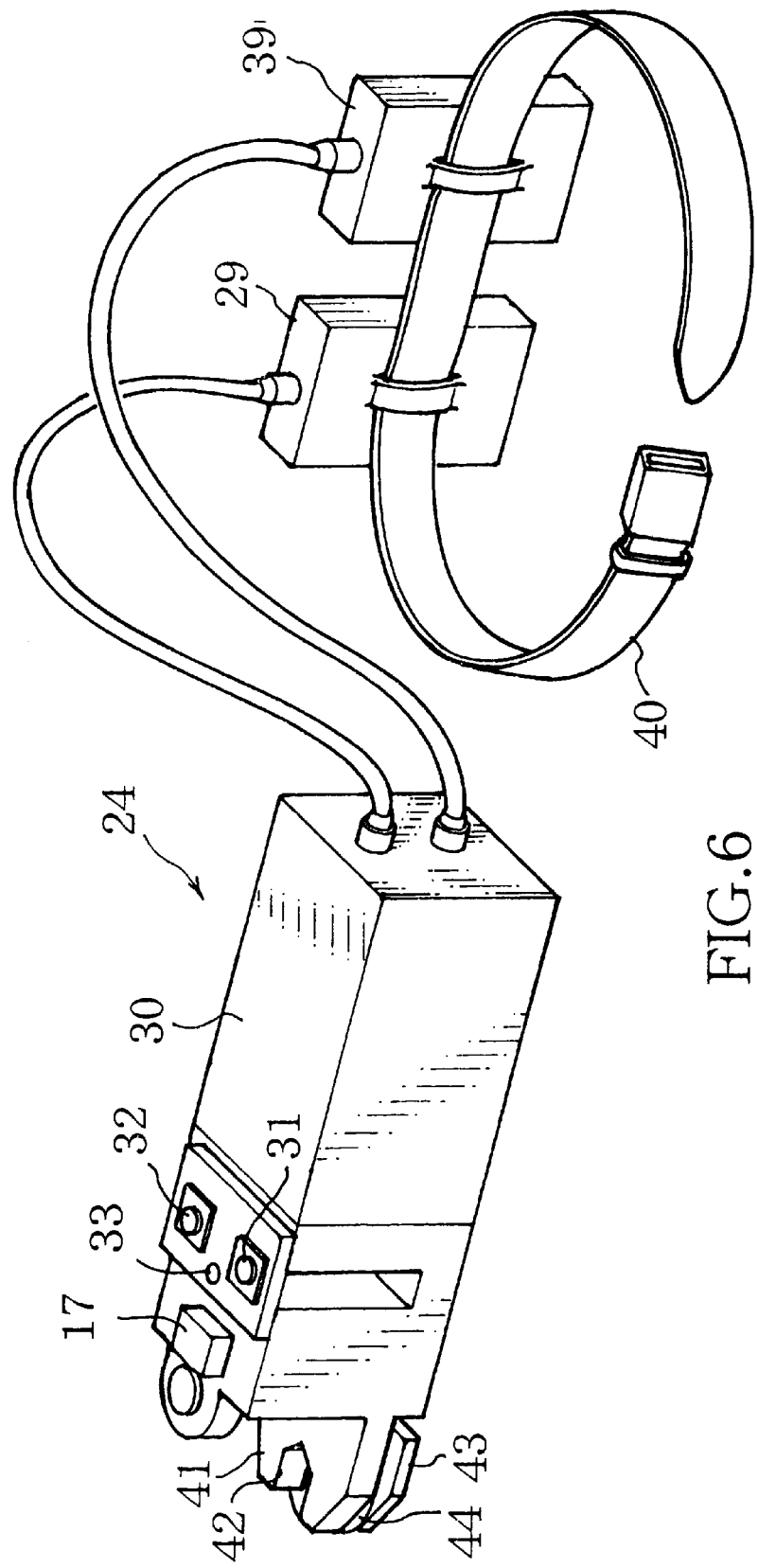
FIG. 6 is a perspective view schematically showing the appearance of a tightening machine for use in the tightening system.
Figure 7:
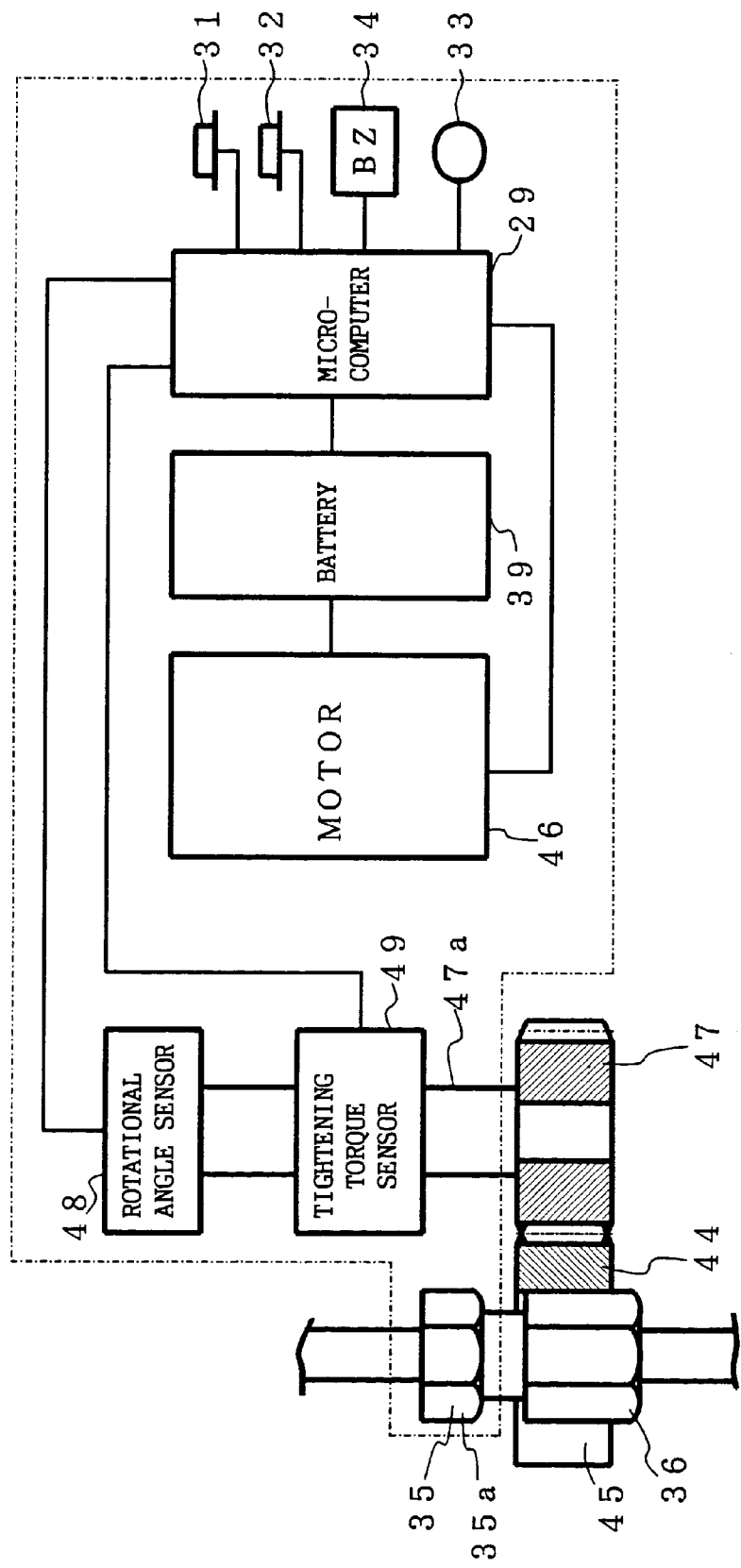
FIG. 7 is a block diagram schematically showing a checking assembly of the tightening machine.

With reference to FIGS. 6 and 7, the tightening machine 24 comprises an upper plate 41 projecting from a body 30, a lower plate 43 disposed under the upper plate 41 in parallel thereto, a nut rotating gear 44 supported by the lower plate 43 so as to be rotatable in a horizontal plane, and a transmission gear 47 disposed inside the body 30 and meshing with the gear 44 for rotating this gear.

The upper plate 41 is provided with a flange holder 42 for fitting therein a flange 35*a* of an externally threaded member 35 of a pipe joint to prevent the rotation of the member 35. The nut rotating gear 44 is formed with a nut socket 45 for fitting a nut 36 therein.

Provided inside the body 30 are a DC servomotor 46 for rotating the transmission gear 47 by way of a train of gears, the aforementioned microcomputer 29 and a motor driving battery 39. The body 30 is further provided with a start button 31, emergency stop button 32, light-emitting diode 33 and alarm buzzer 34.

The number of revolutions of the transmission gear 47 is counted by a rotational angle sensor 48 and converted to an angle of rotation of the nut. The transmission gear 47 has a shaft 47*a*, to which a strain gauge is affixed. The amount of strain of the shaft 47*a* is converted to tightening torque by a tightening torque sensor 49.

The tightening torque detected by the sensor 49 and the angle of rotation detected by the sensor 48 are fed to the microcomputer 29, which checks whether the nut is tightened up properly. The result is output by the light-emitting diode 33 and the alarm buzzer 34. The microcomputer 29 gives the servomotor 46 commands as to the speed of rotation of the nut 36, angle of rotation of the nut 36, change of direction of rotation of the nut 36 and stopping of the nut 36. The battery 39 and the microcomputer 29 are incorporated in the tightening machine, or held to a band 40 as shown in FIG. 6.

Figure 8:
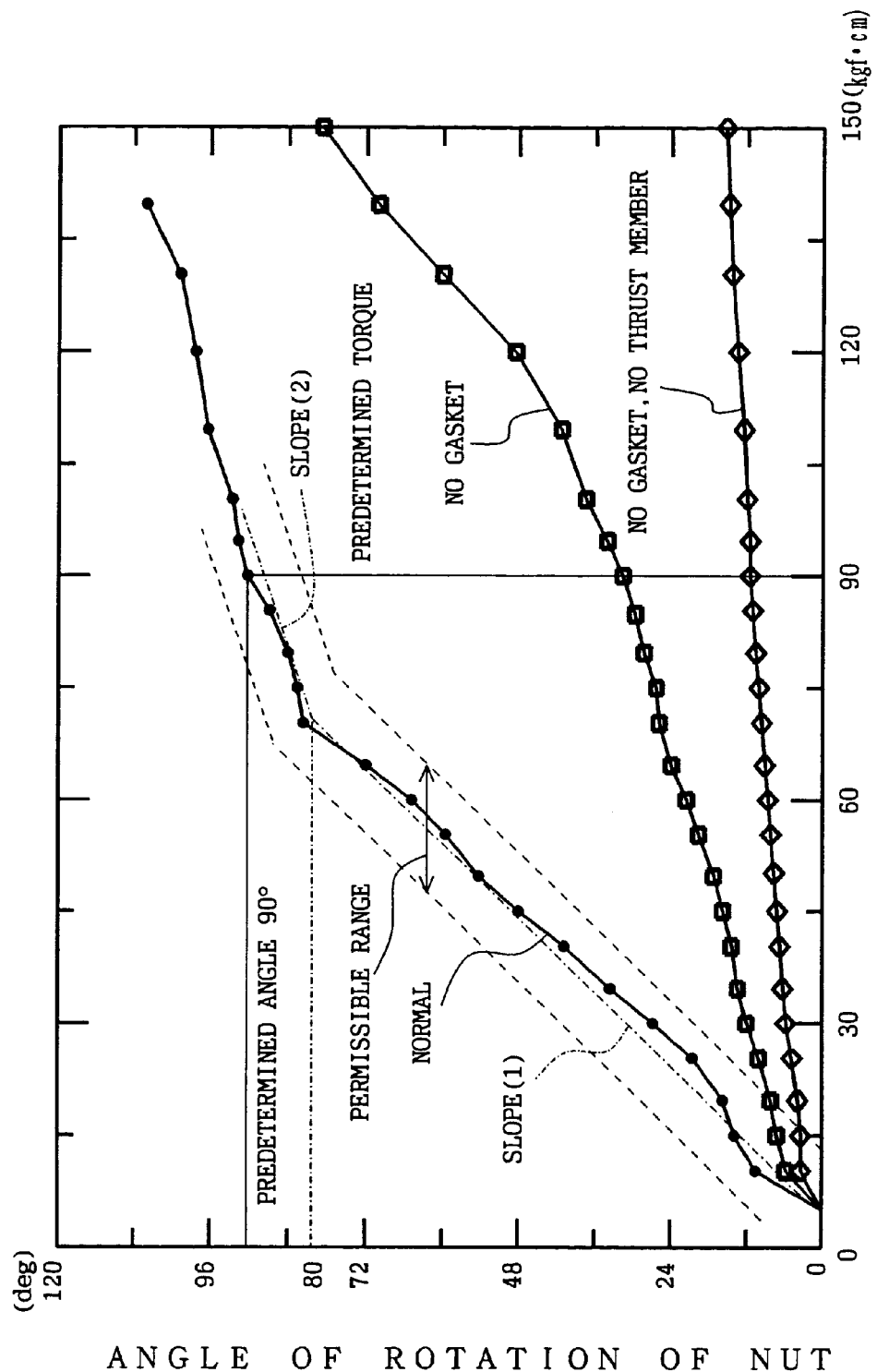
FIG. 8 is a graph showing the tightening conditions to be checked for the tightening machine for use in the tightening system.

FIG. 8 shows the relationship between the angle of rotation of the nut 36 and the tightening torque as established when the nut is tightened up normally or abnormally on the externally threaded member 35 with a wrench. In the normal case, the tightening torque increases in a linear relation (slope (1)) with the angle of rotation of the nut 36 as the nut is tightened through an angle of up to about 80 deg as will be apparent from FIG. 8. The slope alters at an angle of about 80 deg, and the tightening torque thereafter increases in a linear relation (slope (2)) with the angle of rotation of the nut. When the worker forgot to insert a gasket into the pipe joint, the increase in the tightening torque is greater than in the normal case to exhibit a different slope. If the worker forgot to insert both the gasket and thrust bearing, the increase in the tightening torque becomes still greater, showing a slope different from the slope in the absence of the gasket. Accordingly, the tightening torque value relative to the angle of rotation of the nut and the slope of the tightening torque relative to the angle are usable as reference values for checking the tightening. Alternatively, the angle of rotation of the nut can be calculated from the speed of rotation of the motor, and the tightening torque from the current of the motor, so that the speed of rotation of the motor and the current of the motor are usable as tightening conditions for checking whether the nut has been tightened up properly.

Figure 9:
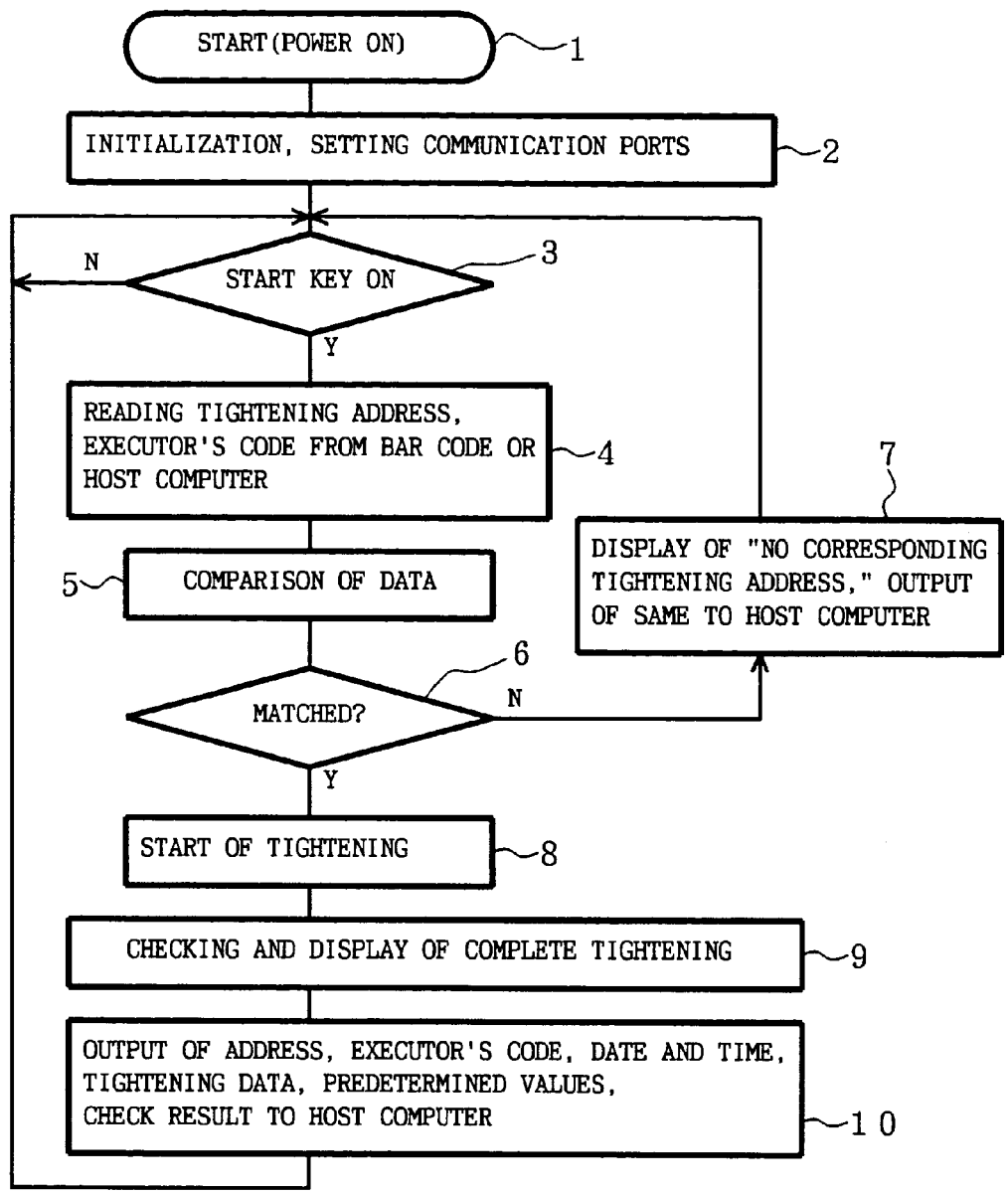
FIG. 9 is a flow chart showing the main routine of the checking assembly of the tightening system.

The main routine of the tightening data processor 25 will be described with reference to FIG. 9.

When the power supply is turned on (step 1), the system is initialized (step 2), whereupon the start key is pressed (step 3). The tightening address and executor's code are read from the bar code (step 4). Alternatively, the address and the code may be read from the host computer in step 4. The tightening address and the executor's code are compared with the respective tightening address and executor' code stored in the memory (step 5), and checked for a match (step 6). If the read data does not match the stored data, the controller displays "no corresponding tightening address," and feeds the result to the host computer, whereupon the sequence returns to step 3 (step 7). When a match is obtained in step 6, a tightening operation is started (step 8). Before the tightening operation, the nut 36 is manually screwed on the externally threaded member 35, the flange holder 42 of the upper plate 41 is fitted to the flange 35a on the member 35, and the nut 36 is fitted in the nut socket 45 of the nut rotating gear 44. The start button 31 is then pressed. The nut 36 is thereafter automatically tightened up on the externally threaded member 35, and checked as to whether the nut has been tightened up normally to complete the tightening operation (step 9). Regardless of the check result, the tightening address, executor's code, tightening date and time, predetermined values for tightening and check result are output to the host computer (step 10).

Although a proper tightening operation can be assured merely by using the tightening machine 24 which itself has the checking function described, the use of the host computer for accumulating the result of tightening enables the supervisor to preserve and recognize the record of the proper tightening operation conducted by the tightening machine. In addition to the reliable operation of the tightening machine 24 itself, this feature achieves a further improvement in the reliability of the tightening operation.

What is claimed is:

1. A system for supervising piping work comprising an automatic welder for welding pipes, a welding data output device for outputting predetermined values of welding conditions for the welder and actual welding data, a welding data processor for checking whether output values from the output device are proper and temporarily accumulating the welding data and the result of checking, and a host computer connected to the processor by communication means for accumulating the welding data and the result of checking, wherein the welder is set at a welding frequency of predetermined times until the replacement of the electrode, the number of times the welding operation is conducted following the replacement is automatically counted, and an alarm for the replacement of the electrode is given on completion of the last welding operation.

2. A system for supervising piping work as defined in claim 1 wherein the communication means is on a spread-spectrum system.

3. A system for supervising piping work as defined in claim 1 wherein the host computer is connected to a plurality of terminal computers by a network.

* * * * *